(12) United States Patent
Grace

(10) Patent No.: US 10,256,897 B2
(45) Date of Patent: Apr. 9, 2019

(54) COMMUNICATION NETWORK AND METHOD

(71) Applicant: Stratospheric Platforms Ltd, Douglas (IM)

(72) Inventor: David Grace, York (GB)

(73) Assignee: Stratospheric Platforms Ltd, Douglas (IM)

( * ) Notice: Subject to any disclaimer, the term of this patent is extended or adjusted under 35 U.S.C. 154(b) by 0 days.

(21) Appl. No.: 15/316,768

(22) PCT Filed: Jun. 5, 2015

(86) PCT No.: PCT/GB2015/051648
§ 371 (c)(1),
(2) Date: Dec. 6, 2016

(87) PCT Pub. No.: WO2015/189576
PCT Pub. Date: Dec. 17, 2015

(65) Prior Publication Data
US 2017/0201314 A1 Jul. 13, 2017

(30) Foreign Application Priority Data
Jun. 12, 2014 (GB) .................................. 1410497.0

(51) Int. Cl.
*H04B 7/185* (2006.01)
*H04W 88/04* (2009.01)
(Continued)

(52) U.S. Cl.
CPC ......... *H04B 7/18504* (2013.01); *H04L 5/006* (2013.01); *H04L 5/0035* (2013.01); *H04W 40/22* (2013.01); *H04W 88/04* (2013.01)

(58) Field of Classification Search
CPC ... H04B 7/18504; H04L 5/0035; H04L 5/006; H04W 40/22
See application file for complete search history.

(56) References Cited

U.S. PATENT DOCUMENTS

| | | | |
|---|---|---|---|
| 2010/0164805 A1* | 7/2010 | Niu | H01Q 1/125 342/377 |
| 2010/0167743 A1* | 7/2010 | Palanki | H04B 7/155 455/436 |

(Continued)

FOREIGN PATENT DOCUMENTS

| | | |
|---|---|---|
| EP | 2624619 | 8/2013 |
| WO | WO-2011103719 | 9/2011 |

(Continued)

OTHER PUBLICATIONS

"International Application No. PCT/GB2015/051648, International Preliminary Report on Patentability dated Dec. 22, 2016", 9 pgs.

(Continued)

*Primary Examiner* — Afshawn M Towfighi
(74) *Attorney, Agent, or Firm* — Schwegman Lundberg & Woessner, P.A.

(57) ABSTRACT

A communication network comprising a plurality of base stations arranged to communicate data to and from a plurality of mobile devices, and at least one first base station operable to establish a first wireless communication link with a selected mobile device from the plurality of mobile devices, said first wireless communication link enabling the selected mobile device to simultaneously provide further wireless communication links to two or more mobile devices for communicating data via the first wireless communication link.

19 Claims, 7 Drawing Sheets

(51) Int. Cl.
*H04L 5/00* (2006.01)
*H04W 40/22* (2009.01)

(56) References Cited

U.S. PATENT DOCUMENTS

| | | | |
|---|---|---|---|
| 2011/0019606 A1 | 1/2011 | Umeda et al. | |
| 2013/0176934 A1 | 7/2013 | Malladi | |
| 2013/0265872 A1* | 10/2013 | Noh ..................... | H04L 47/38 |
| | | | 370/232 |
| 2013/0301405 A1 | 11/2013 | Fuste Vilella et al. | |
| 2014/0274064 A1* | 9/2014 | Al-Shalash .......... | H04W 24/08 |
| | | | 455/437 |
| 2015/0043419 A1* | 2/2015 | Boudreau .............. | H04B 7/026 |
| | | | 370/315 |

FOREIGN PATENT DOCUMENTS

| | | |
|---|---|---|
| WO | WO-2011153507 A2 | 12/2011 |
| WO | WO-2015189576 | 12/2015 |

OTHER PUBLICATIONS

"International Application No. PCT/GB2015/051648, International Search Report and Written Opinion dated Aug. 25, 2015", (Aug. 25, 2015), 11 pgs.

\* cited by examiner

COMMUNICATION NETWORK AND METHOD

PRIORITY CLAIM TO RELATED APPLICATIONS

This application is a U.S. national stage application filed under 35 U.S.C. § 371 from International Application Serial No. PCT/GB2015/051648, which was filed 05 Jun. 2015, and published as WO2015/189576 on 17 Dec. 2015, and which claims priority to United Kingdom Application No. 1410497.0, filed 12 Jun. 2014, which applications and publication are incorporated by reference as if reproduced herein and made a part hereof in their entirety, and the benefit of priority of each of which is claimed herein.

TECHNICAL FIELD

The present invention relates to communication networks, such as cellular communication networks, including base stations arranged to communicate data to and from mobile devices. In particular, but not exclusively, the invention relates to networks, apparatus and methods for increasing the communication capacity within specific areas of such communication networks.

BACKGROUND

Communication networks, such as cellular communication networks, usually include spatially dispersed base stations connected to a core network. Each base station supports communication links to mobile devices within a given coverage area (e.g. a cell). Users of such networks are not usually evenly geographically distributed. Instead, they tend to be concentrated in particular areas such as towns and cities. Certain areas such as metropolitan centres, train stations, airports and so on are likely to experience particularly high densities of users.

Each base station can only support a certain level of data communication before the quality of service to individual mobile devices begins to reduce. Therefore, in areas of high user density, to provide sufficient communication capacity, conventionally networks are arranged with a higher number of base stations which provide a greater number of smaller cells. In areas that only experience high densities of users occasionally (for example rural areas that host music festivals or areas around and including sporting stadiums) cellular communication network providers may also deploy additional permanent base stations to provide a higher number of smaller cells. However, this is inefficient as unlike areas that experience consistently high user densities, for much of the time the additional communication capacity may go unused or under used. Alternatively, temporary base stations can be deployed and only used during periods of high user density. However, this can be logistically difficult and requires the network operator to retain potentially large amounts of physical infrastructure that is normally not used. Similarly, it can be difficult to efficiently provide additional communication capacity for areas within a network that experience high densities of users unexpectedly or unpredictably.

SUMMARY OF INVENTION

In accordance with a first aspect of the invention there is provided a communication network comprising a plurality of base stations arranged to communicate data to and from a plurality of mobile devices. The plurality of base station further comprises at least one first base station operable to establish a first wireless communication link with a selected mobile device from the plurality of mobile devices, said first wireless communication link enabling the selected mobile device to simultaneously provide further wireless communication links to two or more mobile devices for communicating data via the first wireless communication link. In accordance with this aspect of the invention a technique is provided whereby the communication capacity of a specific part of a communication network comprising a plurality of base stations can be increased by the provision of a specially adapted base station (the first base station) and a specially selected mobile device (the selected mobile device). The adapted base station is arranged to establish a wireless communication link with the selected mobile device which enables the selected mobile device to, at least temporarily, itself function as a base station.

Conventional techniques for increasing communication capacity in a communication network rely on simply adding further conventional base stations. In contrast, in accordance with certain embodiments of the present technique, mobile devices themselves can be configured to temporarily function as base stations. This increases communication capacity but does not require additional conventional base stations to be deployed. Moreover, by selecting an appropriately positioned mobile device, the communication capacity of specific areas of the network can be increased on a dynamic basis. This means that the communication capacity within areas of a communication network experiencing occasional or unexpected or unpredictable increases in user density can be temporarily and thus efficiently increased.

Optionally, the further wireless communication links are provided by a temporary base station radio interface provided by the selected mobile device.

Optionally, each temporary base station radio interface corresponds to a base station radio interface provided by other base stations of the plurality of base stations.

Optionally, the first wireless communication link provides a backhaul communication link for communicating data to and from a core network of the communication network.

Optionally, the communication network further comprises a network control element. The first base station is operable to establish a second wireless communication link with a second selected mobile device of the plurality of mobile devices in response to the network control element determining if at least one re-selection criteria is satisfied. The second wireless communication link enables the second selected device to simultaneously provide a second set of further wireless communication links to two or more mobile devices for communicating data in the network via the second wireless communication link.

Optionally, the first base station ceases to provide the first wireless communication link to the selected mobile device responsive to the re-selection criteria being satisfied.

Optionally, the re-selection criteria is satisfied if the network control element determines that a signal to noise ratio (SINR) of the first wireless communication link at the first base station has dropped below a threshold level or a signal to noise ratio (SINR) of the first wireless communication link at the selected mobile device has dropped below a threshold level.

Optionally, the re-selection criteria is satisfied if the network control element determines the selected mobile device has provided the first wireless communication link for a period of time equal to or greater than a threshold period of time.

Optionally, the re-selection criteria is satisfied if the network control element determines an amount of energy equal to or less than a threshold amount of energy is available in a battery cell of the selected mobile device.

Optionally, the first base station is operable to establish the second wireless communication link with the second selected device in response to the network control element selecting the second selected device from a set of the plurality of mobile devices available to provide further wireless communication links to other mobile devices based on one or more selection parameters associated with the second selected device.

Optionally, the selection parameters include a parameter indicating whether the second selected device is externally powered.

Optionally, the selection parameters include a parameter indicating whether or not a threshold amount of energy is available in a battery cell of the second selected device.

Optionally, the selection parameters include a parameter indicating a number of mobile devices of the plurality of mobile devices to which the second selected device can provide the second set of further wireless communication links.

Optionally, the first base station is operable to establish the second wireless communication link with the second selected device in response to the network control element randomly selecting the second selected device from the set of the plurality of mobile devices available to provide further wireless communication links to other mobile devices.

Optionally, a downlink channel and/or uplink channel of the first wireless communication link, or a downlink channel and/or uplink channel of the first wireless communication link and a downlink channel and/or uplink channel of the second wireless communication link, are provided by a directional beam.

Optionally, the first base station is incorporated in an aerial vehicle.

Optionally, the first base station is operable to establish a further wireless communication link with a further selected mobile device from the plurality of mobile devices. The further wireless communication link enables the further selected mobile device, and the selected mobile device to provide the further wireless communication links to two of the two or more mobile devices in accordance with a physical layer network coding arrangement.

Optionally, the first base station is operable to establish a further wireless communication link with a further selected mobile device from the plurality of mobile devices. The further wireless communication link enables the further selected mobile device, and the selected mobile device to provide the further wireless communication links to one or more of the two or more mobile devices in accordance with a co-ordinated multipoint (CoMP) arrangement.

Typically, the selected mobile device comprises an adapted transceiver for providing the further wireless communication links to the two or more mobile devices.

In accordance with a second aspect of the invention, there is provided a method of communicating data in a communication network comprising a plurality of base stations arranged to communicate data to and from a plurality of mobile devices. The method comprises establishing a first wireless communication link between a selected mobile device of the plurality of mobile devices and a first base station of the plurality of base stations, and by virtue of the first wireless communication link, simultaneously providing further wireless communication links to two or more mobile devices for communicating data via the first wireless communication link.

In accordance with a third aspect of the invention there is provided a base station for operating in a communication network according to the first aspect of the invention. The base station is operable to establish a first wireless communication link with a selected mobile device from a plurality of mobile devices. The first wireless communication link enables the selected mobile device to simultaneously provide further wireless communication links to two or more mobile devices for communicating data in a communication network via the first wireless communication link.

In accordance with a fourth aspect of the invention, there is provided a mobile device for operating in a communication network according to the first aspect of the invention. The mobile device comprises a transceiver operable to establish a first wireless communication link with a base station and upon establishment of the first wireless communication link. The transceiver is operable to simultaneously provide further wireless communication links to two or more mobile devices for communicating data via the first wireless communication link.

Optionally, the further wireless communication links are provided by a temporary base station radio interface provided by the transceiver.

Optionally, the transceiver is arranged such that the temporary base station radio interface corresponds to base station radio interfaces provided by other base stations of the communication network.

In accordance with a fifth aspect of the invention, there is provided a method of operating a mobile device in a communication network according to the first aspect of the invention. The method comprises, at the mobile device establishing a first wireless communication link with a base station, and, upon establishment of the first wireless communication link, simultaneously providing further wireless communication links to two or more mobile devices for communicating data via the first wireless communication link.

Optionally, the method further comprises providing the further wireless communication links by a temporary base station radio interface.

Optionally, each temporary base station radio interface corresponds to a base station radio interface provided by other base stations of the communication network.

In accordance with a sixth aspect of the invention, there is provided a computer program comprising instructions which when implemented on a computer processor (for example a processor of a mobile device) causes the computer processor to perform a method according to the fifth aspect of the invention.

In accordance with a seventh aspect of the invention, there is provided a computer program product on which is stored a computer program in accordance with the sixth aspect of the invention.

In accordance with an eighth aspect of the invention there is provided apparatus constructed and arranged substantially as herein described with reference to the accompanying drawings.

In accordance with an ninth aspect of the invention there is provided methods substantially as herein described with reference to the accompanying drawings.

Various aspects and features of the invention are defined in the claims.

BRIEF DESCRIPTION OF THE FIGURES

Certain embodiments of the present invention will now be described hereinafter, by way of example only, with reference to the accompanying drawings in which.

In the drawings like reference numerals refer to like parts.

DETAILED DESCRIPTION

Figure 1:
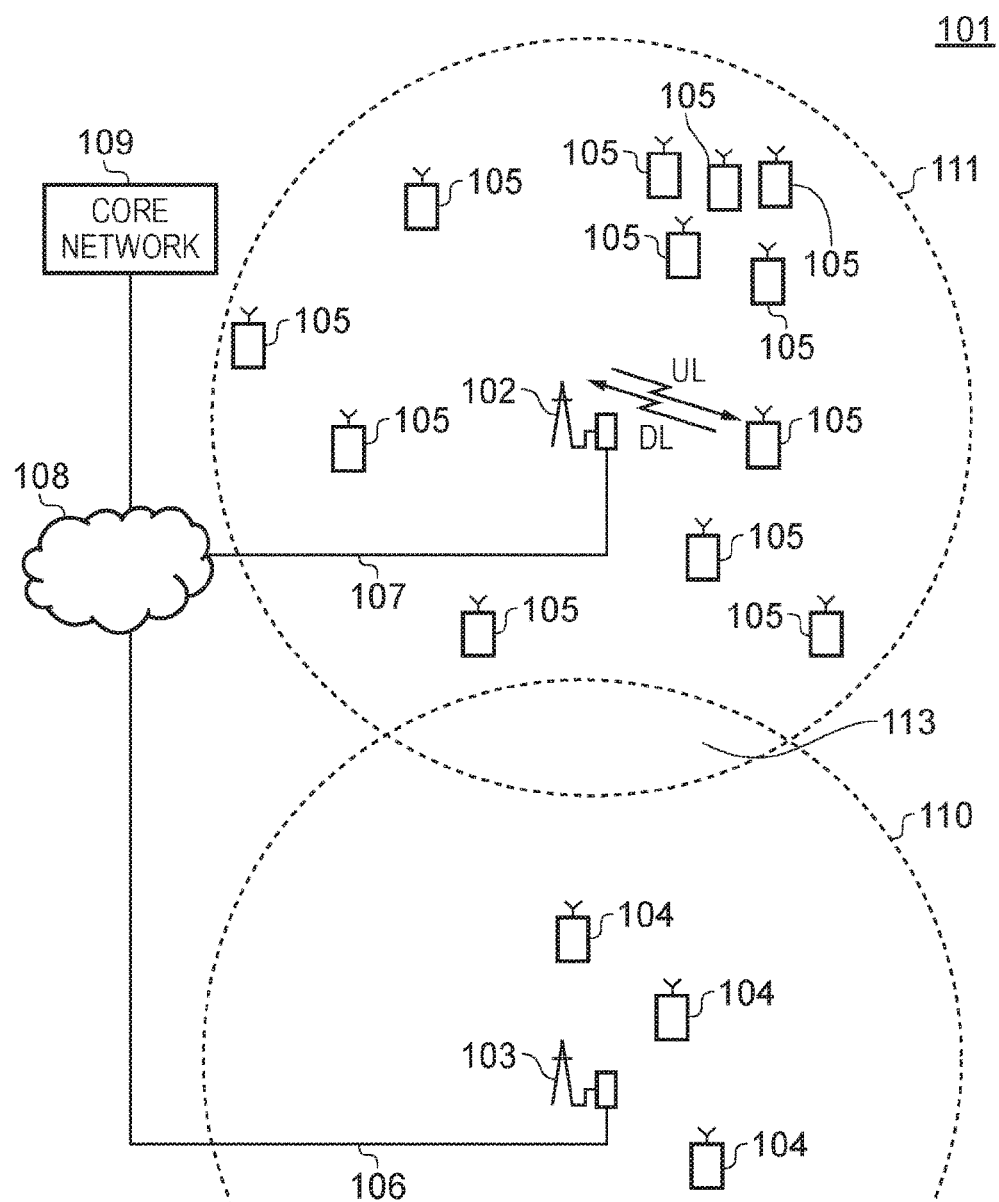
FIG. 1 provides a simplified schematic diagram showing the configuration of a conventional cellular communication network.

FIG. 1 provides a simplified schematic diagram showing the configuration of a conventional cellular communication network 101. Examples of such networks include 2G (e.g. GSM), 3G (e.g. UMTS) and 4G (e.g. LTE) networks or the like.

The communication network 101 includes a plurality of base stations 102, 103 arranged to communicate data to and from a plurality of mobile devices 104, 105 via a base station radio interface. The base station radio interface is a wireless communication link that comprises a wireless uplink and wireless downlink channel. Data is communicated from a mobile device to the base station via the wireless uplink channel and data is communicated from a base station to a mobile device via the wireless downlink channel.

The base stations are each connected via a backhaul communication link 106, 107 and network infrastructure 108 to a core network 109. The backhaul communication link is a high capacity data link arranged to carry user data and signalling data (i.e. control plane data) between the base station and the rest of the network.

The core network 109 typically performs data routing and device mobility management functions.

The area within which a mobile device can send and receive data from a base station is referred to as a "coverage area". For example, a first base station 103 provides a first coverage area 110 enabling data to be communicated between a first plurality of the mobile devices 104 and the first base station 103. A second base station 102 provides a second coverage area 111 enabling data to be communicated between a second plurality of the mobile devices 105 and the second base station 102. The first and second coverage areas 110, 111 overlap in a handover region 113. As is known in the art, mobile devices moving between coverage areas handover from one base station to the other in the handover region 113 in accordance with a handover process.

A high number of mobile devices in a coverage area can lead to a drop in the quality of service provided by the communication network to the mobile devices in that coverage area. Typically, this is because a base station only has a finite communication capacity. That is, at any one time, the base station can only support a finite number of wireless communication links with mobile devices within its coverage area and/or can only support a certain total uplink data rate (i.e. a total amount of data communicated at any one time on all the various uplink channels) and a certain total downlink data rate (i.e. a total amount of data communicated at any one time on all the various downlink channels). These constraints are typically imposed by the bandwidth limitations of the base station radio interface. As the base station approaches or reaches a communication capacity limit, there are various undesirable consequences. The data rate provided by individual wireless communication links may drop; attempts to establish wireless communication links may fail, communication links that are already established may drop and so on.

Communication Network Including Backhaul Base Station and Enhanced Mobile Devices As set out in more detail below, in accordance with examples of the invention, a communication network is provided with specially adapted "backhaul" base stations. These base stations are arranged to selectively establish temporary high data capacity wireless communication links with specially adapted mobile devices. The specially adapted mobile devices include enhanced functionality that enable them, at least temporarily, to be reconfigured to function as base stations within the network. When functioning as a base station, the specially adapted mobile devices provide a base station radio interface which is independent of any existing base station radio interfaces provided by the permanent base stations and communicate data to and from the core network on a backhaul communication link (i.e. the temporary wireless backhaul communication link) that is independent of any existing permanent backhaul communication link. The provision of the temporary wireless backhaul communication link by the backhaul base station enables a specially adapted selected mobile device to temporarily function as a base station. This provides communication capacity that is entirely separate and additional to the communication capacity provided by the conventional base stations within the network. Consequently, this technique allows the communication capacity of a specific part of the network to be temporarily increased, for example, a particularly crowded coverage area in which the base station providing the coverage area is reaching its communication capacity limit.

Figure 2:
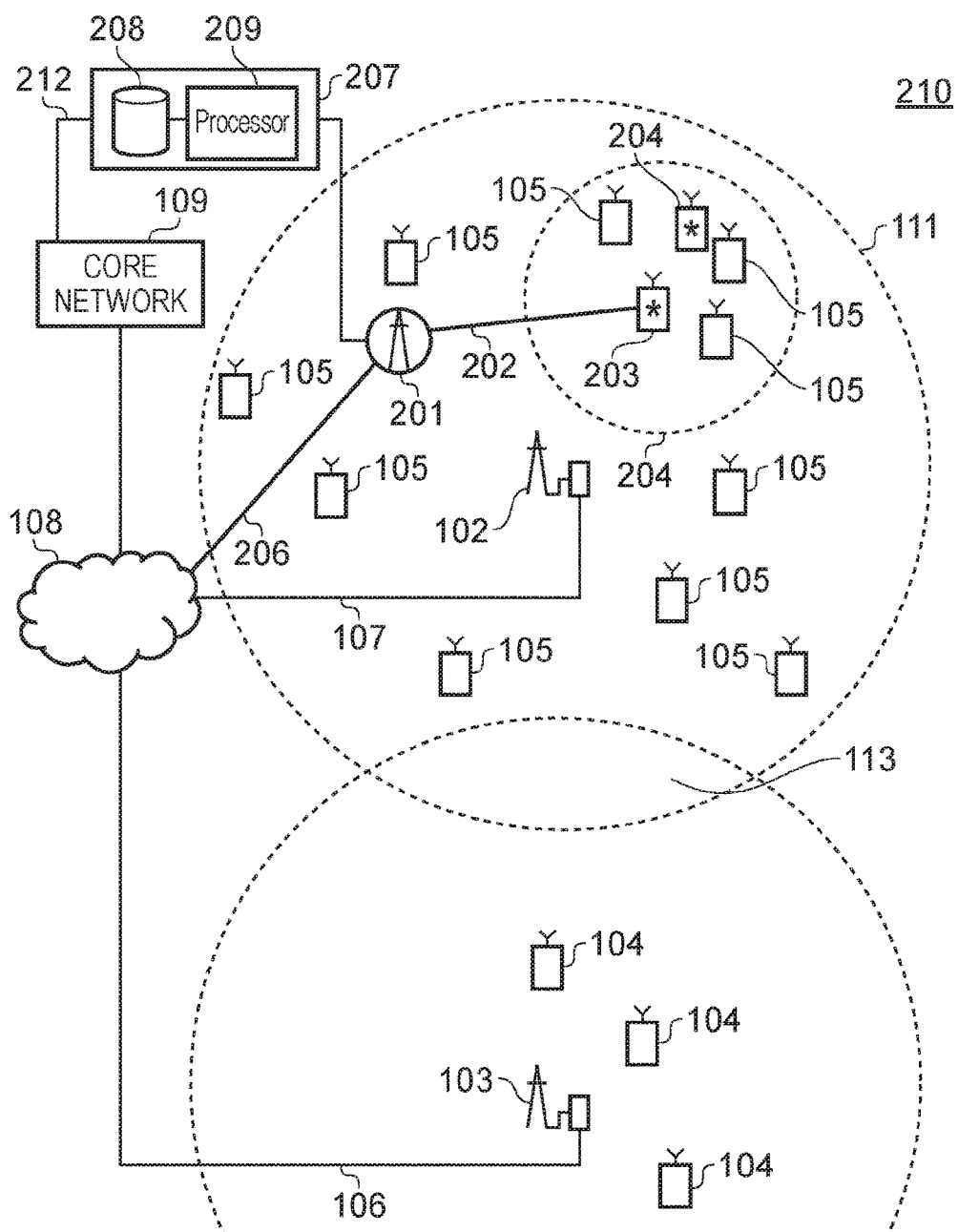
FIGS. 2 and 3 provide schematic diagrams of a communication network arranged in accordance with an example of the invention.

FIG. 2 provides a schematic diagram of a communication network 210 arranged in accordance with a certain embodiment of the invention. Like parts of the conventional network 101 shown in FIG. 1 are provided with corresponding reference numerals.

The communication network shown in FIG. 2 corresponds to that of the conventional network shown in FIG. 1 except that a backhaul base station 201 is provided. As with the conventional base stations 102, 103, the backhaul base station 201 is connected via a backhaul communication link 206 and via the network infrastructure 108 to the core network 109.

The backhaul base station 201 is arranged to establish a temporary wireless backhaul communication link 202 with an enhanced mobile device 203. The temporary wireless backhaul communication link 202 acts as a backhaul base station link connecting the enhanced mobile device 203 with the rest of the network.

The temporary wireless backhaul communication link 202 includes a downlink channel (transmitted from the backhaul base station and received by the enhanced mobile device) for sending data from the backhaul base station to the enhanced mobile device, and an uplink channel (transmitted from enhanced mobile device and received by the backhaul base station) for sending data from the backhaul base station to the enhanced mobile device. The enhanced mobile device 203 is provided with conventional functionality enabling it to operate as a conventional mobile device and also additional functionality which enables it to temporarily function as a base station when connected with the backhaul base station via a temporary wireless backhaul communication link. That is, in conjunction with the establishment of the temporary wireless backhaul communication link 202, the enhanced mobile device 203 can be temporarily configured to function as a base station and provide a temporary base station radio interface enabling mobile devices to communicate data to and from the core network. As will be understood, this means the enhanced mobile device can simultaneously provide further wireless communication links to two or more mobile devices for communicating data via the temporary wireless backhaul communication link. It will be understood that reference to "mobile devices" in the following description can refer to conventional mobile devices (i.e. ones lacking the additional functionality of the enhanced mobile devices) and enhanced mobile devices currently functioning as mobile devices.

The enhanced mobile device 203 can communicate data to and from mobile devices within a temporary coverage area 204.

The temporary base station radio interface is an equivalent type of wireless communication link (i.e. with a wireless uplink and downlink channel) provided to individual mobile devices by the conventional base stations. That is, the temporary base station radio interface corresponds to a base station radio interface provided by other base stations of the plurality of base stations.

In some examples, the temporary base station radio interface provided by the enhanced mobile device is such that it appears to the conventional mobile devices as a conventional base station radio interface. That is, when the enhanced mobile device 203 is configured to function as a temporary base station, the temporary base station radio interface is such that conventional mobile devices 105 in the first coverage area detect and "camp on" to the base station radio interface provided by the enhanced mobile device 203 as if it were a conventional base station such as the second base station 102.

It will be understood that in order to provide the temporary base station radio interface as described above, the enhanced user device includes suitable hardware, such as a transceiver unit, that is suitably adapted to provide such a radio interface. This includes hardware and software components to provide all the relevant radio interfaces and to manage the relevant control plan signalling to and from the mobile devices and to and from the rest of the network When the enhanced mobile device 203 is configured as a temporary base station, it is likely that its power consumption will increase and resources normally available to a user (such as processor bandwidth for running apps and so on) will be reduced. Accordingly, in some examples, the network is arranged to limit a period of time that an enhanced mobile device is configured as a temporary base station. Examples of how this can be achieved is explained in more detail below.

Figure 3:
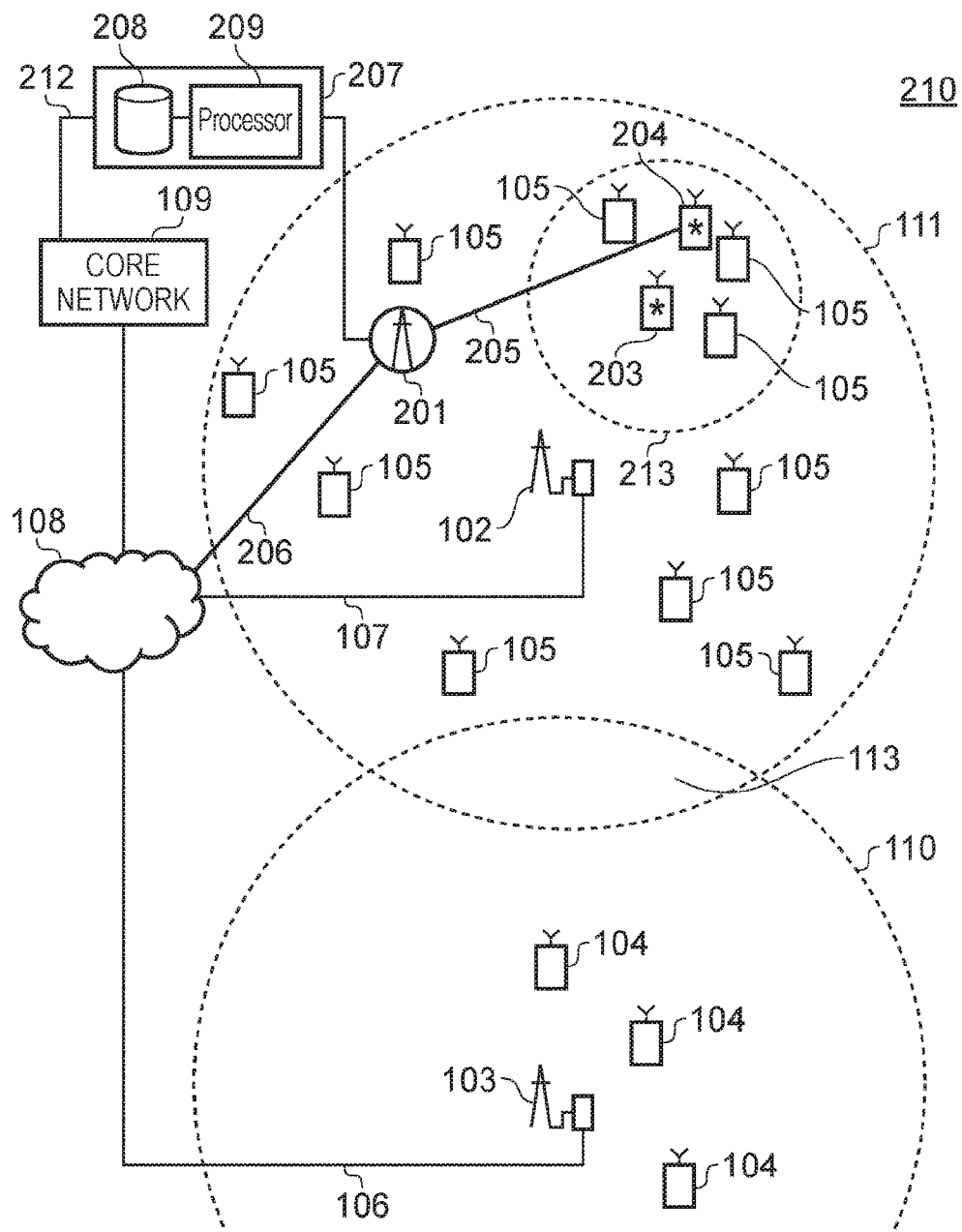

FIG. 2 shows a second enhanced mobile device 204 which is not connected to the backhaul base station. The second enhanced mobile device 204 includes the additional functionality which enables it to temporarily function as a base station but in the example shown in FIG. 2, in the absence of an established temporary wireless backhaul communication link, the second enhanced mobile device 204 functions as a conventional mobile device. As set out in more detail below, after a certain period of time, or in response to specific events, the backhaul base station is arranged to terminate (i.e. cease to provide) the temporary wireless backhaul communication link 202 with the first enhanced mobile device 203 and establish a second wireless backhaul communication link 205 with the second enhanced mobile device 204. This is shown in FIG. 3 which is described in more detail below. On establishment of the second temporary communication link 205, the second enhanced mobile device 204 is configured to function as a temporary base station and provide a second temporary coverage area 213. This is shown in FIG. 3. In this way, in networks in which there are multiple enhanced mobile devices, the burden of functioning as a temporary base station (with the likely increase in power consumption and reduction in processing resources normally available to a user) can be spread across multiple devices.

The selection and operation of particular enhanced mobile devices to function as temporary base stations is managed by a network control element. FIGS. 2 and 3 show a network control element 207 connected to the backhaul base station 201. The operation of the network control element is described in more detail below.

Network Control Element

The network control element 207 includes an enhanced mobile device register 208 and a processor 209. The network control element 207 is connected to the core network 109 via a control link 212. The enhanced mobile device register 208 stores the identity and associated status data for each of the enhanced mobile devices in the network 210. The status data relates to specific attributes of the current state of the enhanced mobile device.

The processor 209 is arranged to process the information in the enhanced mobile device register 208 in accordance with various algorithms. In some examples, these algorithms include an availability algorithm to determine which enhanced mobile devices are available to function as temporary base stations; a re-selection algorithm to determine when an enhanced base station currently functioning as a temporary base station should be reconfigured to function as a mobile device, and a selection algorithm to determine which enhanced mobile device should next be configured to function as a base station.

When the network control element 207 determines that a particular enhanced mobile device should be configured to act as a temporary base station, it is arranged to send a suitable reconfiguration message to the enhanced mobile device in question. Typically, the reconfiguration message will be sent to the enhanced mobile device via a control plane message from the core network and transmitted to the enhanced mobile device via a conventional base station or another enhanced mobile device functioning as a base station. This message can also initialise the process for establishing the temporary wireless backhaul communication link.

When the network control element 207 determines that an enhanced mobile device currently configured to function as a temporary base station should be reconfigured to function as a mobile device, then another reconfiguration message can sent. This message can be sent via a control plane message and core network as described above, or can be sent directly from the network control element on the temporary wireless backhaul communication link.

Availability Algorithm

In some examples the enhanced mobile device register 208 maintains an availability indicator that is associated with each enhanced mobile device. The network control element 207 only selects an enhanced mobile device for connection with the backhaul base station 201 if the associated availability indicator in the enhanced mobile device register 208 indicates that the enhanced mobile device is available to function as a base station. The processor is arranged to process the status data in accordance with an availability algorithm. The output of the availability algorithm determines the availability indicator.

In some examples the status data includes one or more of the following parameters related to each enhanced mobile device:

a current location within the network;
an indication of the current energy level available in a battery cell;
an indication of the number of further mobile devices in communication range with the enhanced mobile device (i.e. a number of mobile devices that the enhanced mobile device can provide a base station radio interface to);
user preference data indicating whether or not a user has specified that the enhanced mobile device should not function as a base station;
a length of time since the enhanced mobile device last functioned as a temporary base station;
whether or not the enhanced mobile device is connected to an external power source, and a quality of a temporary wireless backhaul communication link that can be established between the backhaul base station and the enhanced mobile device.

If the availability algorithm determines that any one of these parameters is such that a particular enhanced mobile device cannot function as a base station, the processor 209 sets the availability indicator to indicate that the enhanced mobile device cannot function as a base station. On the other hand, if the availability algorithm determines that no parameters preclude the enhanced mobile device functioning as a base station, the processor 209 sets the availability indicator to indicate that the enhanced mobile device can function as a temporary base station.

Figure 4:
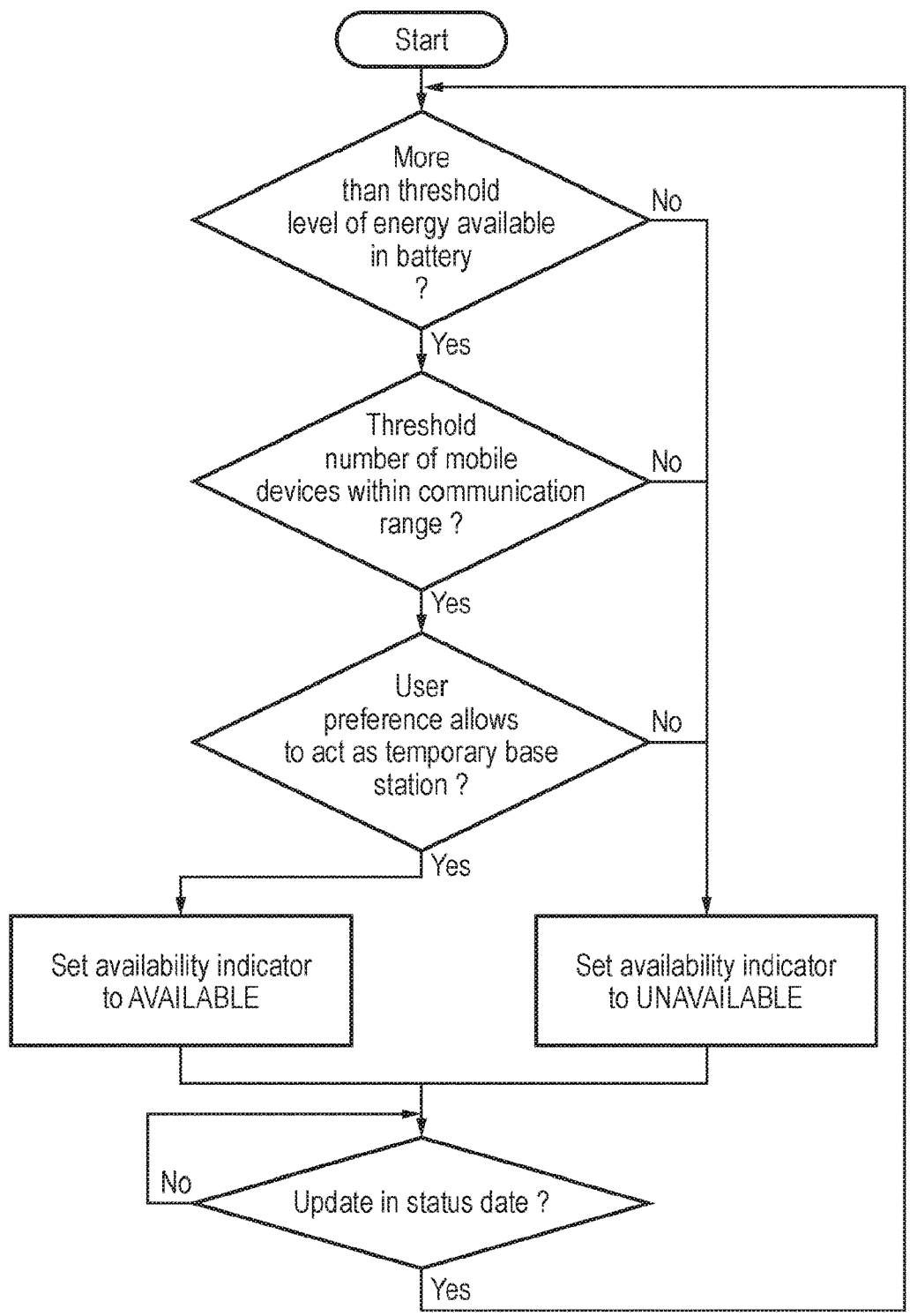
FIG. 4 provides a diagram illustrating of an example of an availability algorithm to determine if a mobile device is available to be configured as a temporary base station.

FIG. 4 provides a diagram illustrating an example of the availability algorithm.

The availability algorithm for a particular enhanced mobile device can be run periodically, continuously or in response to the processor determining that a change in the status data for a particular enhanced mobile device has occurred.

Re-selection Algorithm

During operation, the processor 209 is also arranged to run a temporary base station re-selection algorithm which determines if conditions are such that an enhanced mobile device currently configured as a temporary base station should be reconfigured to function as a mobile device again. This is achieved by determining whether or not various reselection criteria have been satisfied. To this end, the enhanced mobile device register 208 is arranged to maintain additional session status data if an enhanced mobile device is currently functioning as a temporary base station. This additional session status data includes a signal to noise ratio (SINR) associated with the uplink channel and downlink channel of the temporary wireless backhaul communication link between the enhanced mobile device and the backhaul base station; a counter indicating how long the enhanced mobile device has been functioning as a temporary base station and an indication of whether or not the energy in a battery cell of the enhanced mobile device has dropped below a threshold level.

Using the session status data in the mobile device register, the processor 209 performs the re-selection algorithm to determine whether or not the re-selection criteria have been met.

In some examples, the re-selection algorithm determines that the reselection criteria have been satisfied if at least any one of the following events occur:

if a signal to noise ratio (SINR) of the temporary wireless backhaul communication link at the backhaul base station or at the enhanced mobile device drops below a threshold level (i.e. if the SINR of the uplink received at the backhaul base station drops below a threshold level or if the SINR of the downlink received at the enhanced mobile device drops below a threshold level);
if an energy level in a battery cell of the enhanced mobile device functioning as a temporary base station drops below a threshold level,
or if the enhanced mobile device functioning as a temporary base station has functioned as a temporary base station (i.e. provided the temporary base station radio interface) for a threshold period of time.

Figure 5:
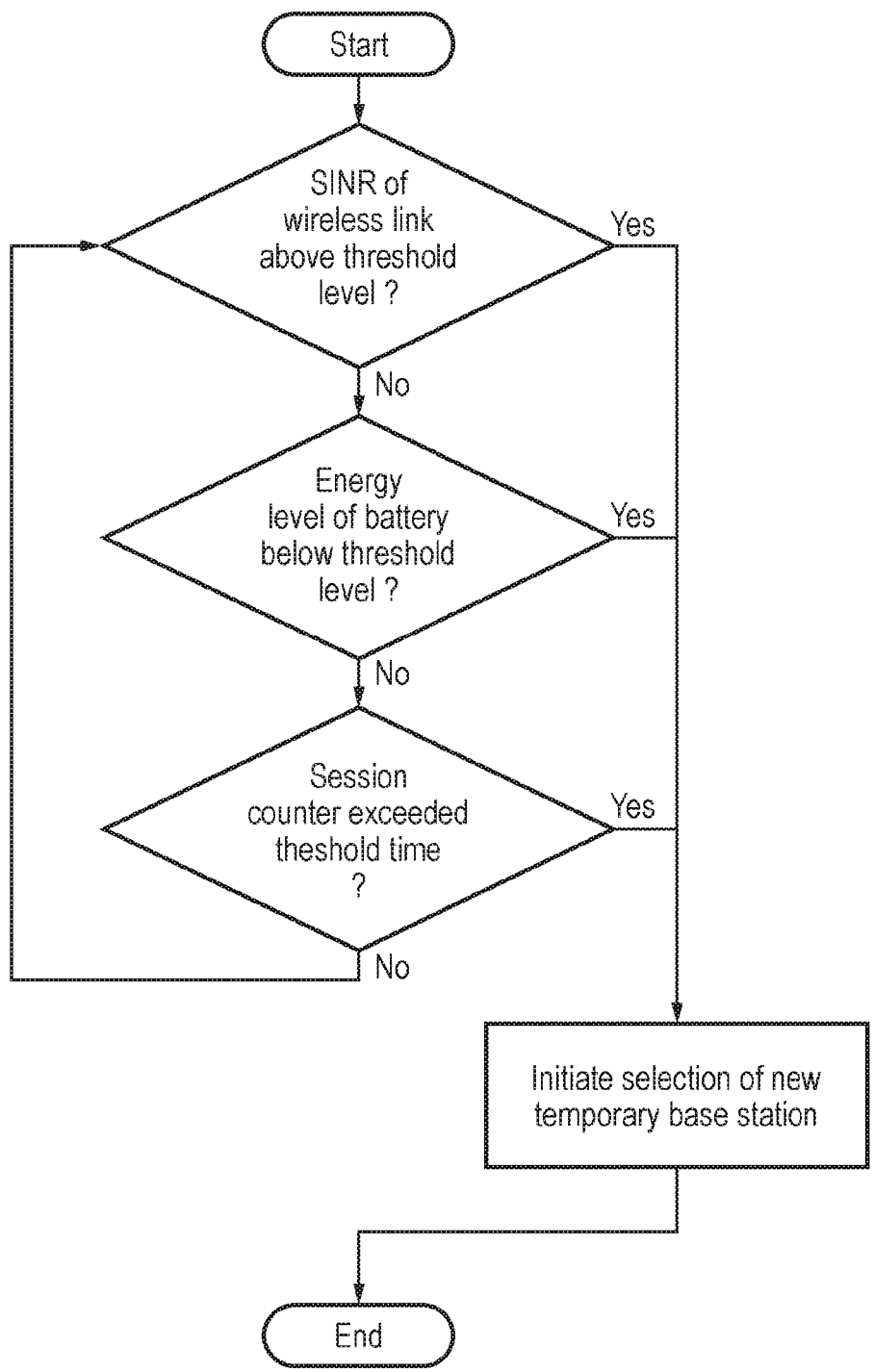
FIG. 5 provides a diagram illustrating an example of a re-selection algorithm to determine if a mobile device currently configured as a temporary base station should be reconfigured to function as a mobile device.

FIG. 5 provides a diagram illustrating an example of the re-selection algorithm. The re-selection algorithm for a particular enhanced mobile device can be run periodically, continuously or in response to the processor determining that a change in the status data for a particular enhanced mobile device has occurred.

Selection Algorithm

Once the processor 209 has determined that the re-selection criteria is met, another enhanced mobile device is configured to function as a temporary base station. For example, with reference to FIGS. 2 and 3, once the processor 209 has performed the reselection algorithm in relation to the first enhanced mobile device 203 and determined, for example, that an energy level in a battery cell of the first enhanced mobile device has dropped below a threshold level (for example below 50% of total capacity), the second enhanced mobile device 203 is configured to function as the temporary base station.

In order to identify another enhanced mobile device to be configured as a temporary base station, the processor 209 performs a selection algorithm. The selection algorithm can be performed before, during or after the re-selection algorithm has been performed. The selection algorithm selects one of the enhanced mobile devices that the availability data in the enhanced mobile device register indicates is available to function as a temporary base station. In situations in which there is only one enhanced mobile device that is available (for example, the simple example illustrated in FIGS. 2 and 3), then this enhanced mobile device is selected by the selection algorithm.

However, if multiple enhanced mobile devices are available then the selection algorithm undertakes a process to identify which enhanced mobile device should next function as a temporary base station. In some examples this is done based on a random selection. In other examples, this is done base on various selection parameters that are, for example, based on the status data held in the enhanced mobile device register. In some examples the selection parameters determine a prioritisation order of the available enhanced mobile devices by the attribution to each selection parameter of a quantitative prioritisation level. The different selection parameters can be ranked in terms of importance, with selection parameters ranked more important more likely to result in a particular enhanced mobile device being selected. In the case where an enhanced mobile device has a number of selection parameters associated with it, a scoring mechanism can be used to sum the total effect of the selection parameters. An enhanced mobile device with the highest score is then selected by the selection algorithm. If two or more enhanced mobile devices have equal scores then one of these enhanced mobile devices can be selected at random.

Status data used as selection parameters include:
a length of time since the enhanced mobile device last functioned as a temporary base station;
an amount of energy available in a battery cell;
whether or not the enhanced mobile device is connected to an external power source;
a quality of a temporary wireless backhaul communication link that can be established between the backhaul base station and the enhanced mobile device;
a physical location of the enhanced mobile device,
and a number of mobile devices that the enhanced mobile device can provide a base station radio interface to.

It will be understood that by selecting an available enhanced mobile device based on the number of other mobile devices to which it can provide a base station radio interface (prioritising, for example, enhanced mobile devices that can provide a base station radio interface to the highest number of other mobile devices) then specific areas of the network likely to be experiencing communication congestion can be targeted to alleviate the congestion. This can also be achieved using the location status data by selecting enhanced mobile device in areas that are known to, or are expected to, experience communication capacity issues.

With reference to the enhanced mobile device register, it will be understood that certain types of status data, for example the session data counter indicating how long the enhanced mobile device has been functioning as a temporary base station, can be maintained at the network control element without receiving any further data from the enhanced mobile device. However, other types of status data, for example status data specifying the SINR of the temporary wireless communication link or whether an enhanced mobile device is currently powered by an external power source can most conveniently be monitored at the enhanced mobile device. This status data is typically communicated from the enhanced mobile device to the network control element. Any suitable communication channel can be used to communicate this type of status data from the enhanced mobile devices to the network control element. For example, if a temporary wireless backhaul communication link is established between an enhanced mobile device and the backhaul base station, then the enhanced mobile device can communicate status data to the network control element via the temporary wireless backhaul communication link.

However, if the temporary wireless backhaul communication link is not established, then the enhanced mobile device is arranged to communicate status data to the network control element via a communication channel established between the network control element and the enhanced mobile device via a conventional base station and the core network and the control link 212.

Certain types of status data, in some examples, is most conveniently monitored using existing infrastructure within the network such as location databases (e.g. a home location register (HLR)). This includes status data relating to the location of particular mobile devices such as the physical location of each enhanced mobile device and the number of mobile devices within a potential temporary coverage area of each enhanced mobile device.

In order to determine how many mobile devices are within a potential temporary coverage area, any suitable technique can be used. For example this could be determined based on a number of mobile devices within a temporary coverage area of an enhanced mobile device currently functioning as a temporary base station and located near the enhanced mobile device in question. Alternatively, this could be based on a combination of location data derived from satellite location functionality (such as a GPS receiver) within the mobile devices and which is communicated back to the network; information about the current location of the enhanced mobile device in question, and, an estimate size of the temporary coverage area that the enhanced mobile device in question could provide.

Handover

Once the processor 209 has performed the re-selection algorithm and determined that the re-selection criteria have been met and has performed the selection algorithm to determine the next enhanced mobile device to function as the temporary base station, a handover process is performed whereby mobile devices currently supported by an enhanced mobile device functioning as a base station are "handed over" to another enhanced mobile device which will begin functioning as a temporary base station. The handover process can be managed by the network control element 207. That is, as described above, the network control element 207 determines when to select another enhanced mobile device to function as a temporary base station and determines which enhanced base station that will be.

However, as set out below, the configuration steps associated with handing over mobile devices from one enhanced mobile device to another can be sent and received by the backhaul base station 201. The handover process is explained further with reference to FIG. 6.

At a first step S601, the backhaul base station 201 sends a reconfiguration message to the second enhanced mobile device instructing it to reconfigure as a temporary base station. The second temporary wireless backhaul communication link 205 is also established with the second enhanced mobile device 204. The second enhanced mobile device 204 is then configured to function as a temporary base station.

At a second step S602, the second enhanced mobile device 204 sends a configuration complete message to the backhaul base station 201.

At the third step S603 the backhaul base station 201 sends a handoff message to the first enhanced mobile device 203 currently functioning as a temporary base station. The handoff message causes the first enhanced mobile device 203 to hand over any mobile devices that it is currently supporting with a base station radio interface to the second enhanced mobile device 204. This is achieved by the exchange of handoff messages between the first and second enhanced mobile devices at a fourth step S604. The handoff messages exchanged at the fourth step S604 can be in accordance with or equivalent to conventional handoff messages exchanged when handing off mobile devices between base stations. Once the handoff of mobile devices from the first enhanced mobile device 203 to the second enhanced mobile device 204 is complete, at a fifth step S605, the first enhanced mobile device 203 sends a handoff complete message to the backhaul base station 201.

At a sixth step S606 the backhaul base station 201 sends a message to the first enhanced mobile device 203 to reconfigure it to function as a mobile device, and at a seventh step the S607 the first enhanced mobile device sends a message to the backhaul base station 201 confirming that this process is complete and the first temporary wireless backhaul communication link 202 is terminated.

Some mobile devices that were previously supported by the first enhanced mobile device when it was functioning as a base station, may not be supported by the second enhanced mobile device, for example because they are outside of the second temporary coverage area 301 provided by the second enhanced mobile device. These mobile devices, during the handoff step S604, are handed over to a conventional base station, e.g. the second base station 102 providing the second coverage area 111.

Enhanced Mobile Device

Figure 7:
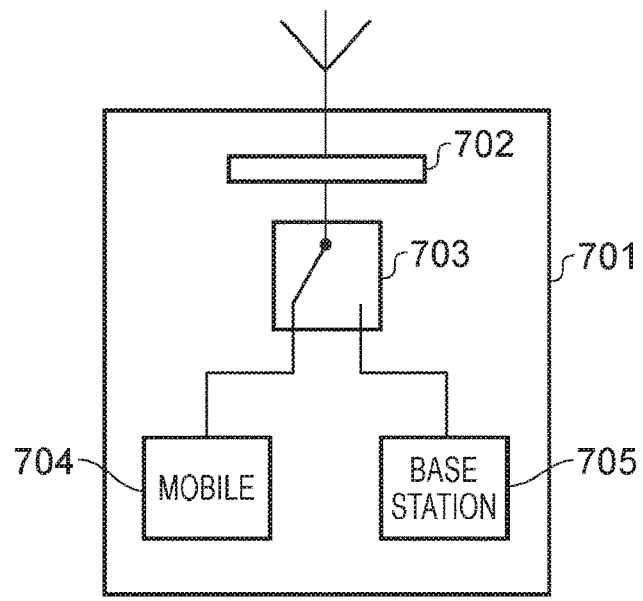
FIG. 7 provides a schematic diagram of an example of functional elements of a mobile device configurable to function as a temporary base station, and FIG. 8 provides a schematic diagram of an example of a backhaul base station.

FIG. 7 provides a schematic diagram of an example of functional elements of an enhanced mobile device 701. It will be understood that the mobile device 701 typically comprises further components not shown for example user input/output means such as a touch sensitive screen, a microphone and speakers etc. The enhanced mobile device 701 includes a transceiver unit 702 for transmitting and receiving data via an antenna array. The enhanced mobile device also includes a function selection unit 703 which is arranged to selectively connect a mobile device functional unit 704 to the transceiver unit 702 or a temporary base station functional unit 705.

The mobile device functional unit 704 implements functionality associated with the operation of a conventional mobile device enabling a user to perform normal user device activities such as making and receive voice calls, surfing the internet, using internet connected apps and so on.

The base station functional unit 705 implements functionality associated with providing a base station radio interface and allowing data to be communicated to and from other mobile devices.

During operation, when the enhanced mobile device is configured to function as a mobile device, that is, when the enhanced mobile device receives a reconfiguration message from the network control element, the function selection unit 703 connects the mobile device functional unit 705 to the transceiver unit 702 and the enhanced mobile device functions as a conventional mobile device. However, when the network control element selects the enhanced mobile device to re-configure as a temporary base station, the transceiver unit 702 establishes a temporary wireless backhaul communication with the backhaul base station and the function selection unit 703 connects the base station functional unit to the transceiver unit 702. The transceiver unit 702 then provides a wireless communication link to mobile devices within a temporary coverage area as described above. That is, the transceiver unit 702 provides an uplink channel and a downlink channel to relevant mobile devices within the temporary coverage area. The base station functional unit 705 provides the requisite functionally to manage these wireless communication links, for example base station/mobile device control channels. Data received from the mobile devices to be communicated onward to the core network is sent from the transceiver unit 702 to the backhaul base station via the temporary wireless backhaul communication link. Similarly, data received from the core network to be forwarded to a particular mobile device is received by transceiver unit 703, processed as appropriate by the base station functional unit 705 and then transmitted to the relevant mobile device by the transceiver unit 702.

It will be understood that the functional units shown in FIG. 7 illustrate the functions performed by an example enhanced mobile device. In some examples, these functional units may be manifested in physically separate units. However, in other examples an enhanced mobile device might include a single processor unit and memory unit on which the functions of the function selection unit 703, the mobile functional unit 704 and the base station functional unit 705 are implemented in software. That is, the mobile functional unit 704 and the base station functional unit 705 can be implemented on the processing unit as separate software modules. More specifically, in some examples, an enhanced mobile device may originally be configured with software providing the functionality associated with the mobile device functional unit 704. However, an app can be downloaded from a server comprising software which when run on the hardware of the mobile device, provides the functionality of the function selection unit 703 and the base station function block 705.

Figure 6:
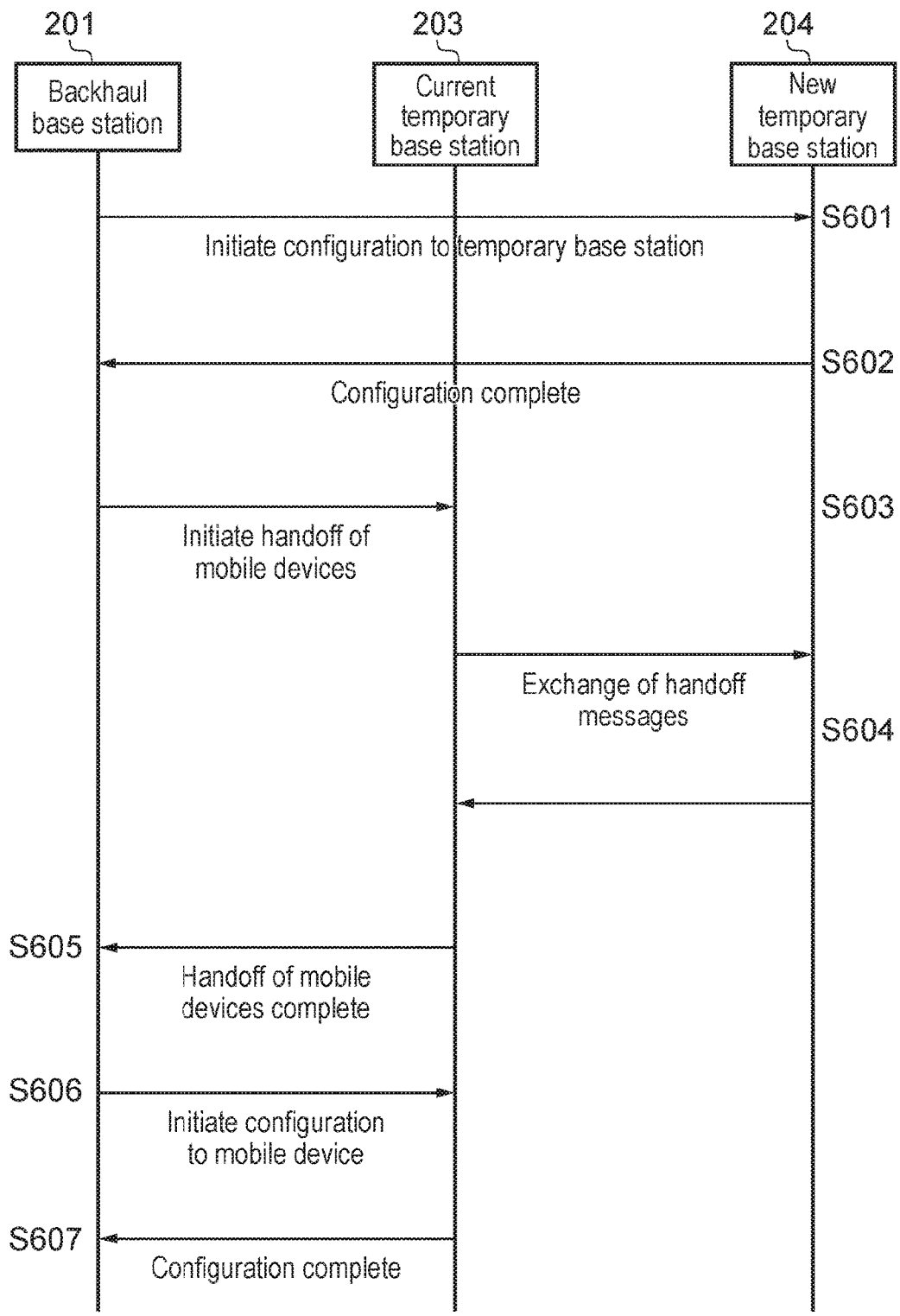
FIG. 6 provides a schematic diagram of a handover process for handing over mobile devices between two mobile devices configured as temporary base stations.

For example, the app can comprises computer implementable instructions that when run on the processor of the enhanced mobile device control the enhanced mobile device to respond to the receipt of a reconfiguration message from the network control element by:
reconfiguring the enhanced mobile device to function as a temporary base station;
establishing and maintaining a temporary wireless backhaul communication link with a backhaul base station;
functioning as a base station for mobile devices within a temporary coverage area; and responsive to the receipt of a second reconfiguration message, undertaking a handover process as detailed in FIG. 6, terminating the temporary wireless backhaul communication link and then reconfiguring the enhanced mobile device to function as a mobile device.

The computer program embodying the app can be stored on a server or on any suitable computer program product such as a CD ROM, floppy disk or solid state memory device.

Examples of enhanced mobile devices can include suitably adapted user devices such as smartphones, tablets, personal computers, games consoles and other similar devices.

As shown in FIG. 7, in some examples the enhanced mobile device effectively has two modes of operation: as a mobile device and as a temporary base station. However, in some examples, the enhanced mobile device may be provided with sufficient physical resources (e.g. processing capacity and suitable transceiver) to perform simultaneously as a temporary base station and as a mobile device.

In some examples, if an enhanced mobile device is arranged to simultaneously function as a mobile device and a temporary base station, the uplink and downlink transmissions to and from the mobile device would be provided by suitably separated resource (e.g. channels, resource blocks etc.) or on sufficiently separate frequency bands with use, if needed, of a diplexer.

Backhaul Base Station

Figure 8:
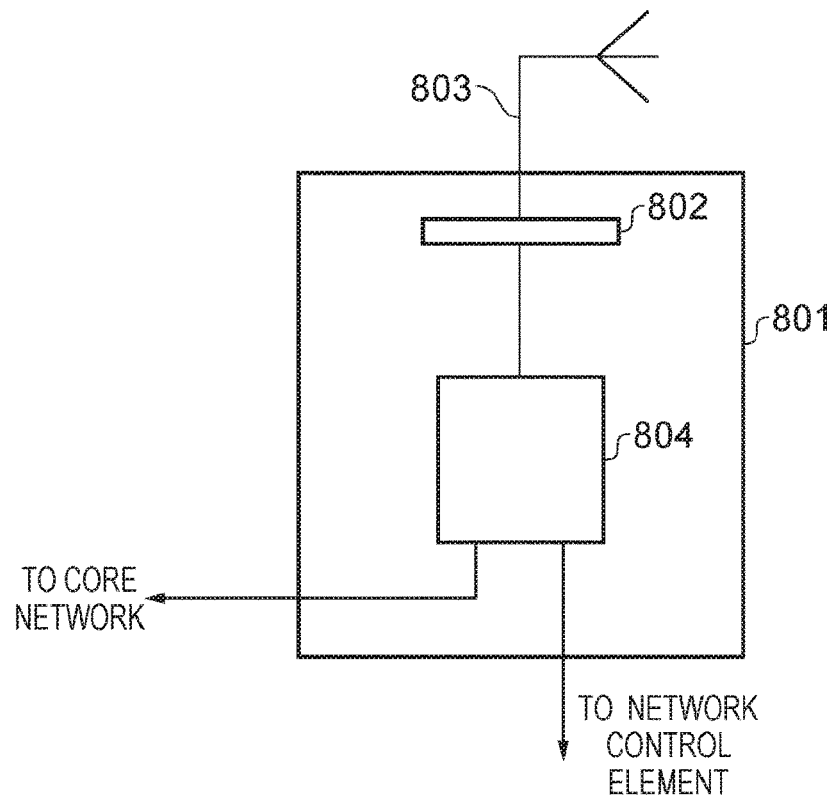

FIG. 8 provides a schematic diagram of an example of a backhaul base station 801. The backhaul base station 801 includes a transceiver unit 802 connected to an antenna array 803 and a processing unit 804. The transceiver unit 802 and antenna array 803 send and receive data on the temporary wireless backhaul communication link established with the enhanced mobile devices. The processing unit 804 provides an interface for sending and receiving data from the core network via the backhaul communication link and sending and receiving data from the network control element via the connection to the network control element.

In some examples, the antenna array 803 comprises a directional antenna and the downlink channel of the temporary wireless backhaul communication link (i.e. the link transmitted from the backhaul base station and received by the enhanced mobile device) is provided by a directional radio beam. In other examples, other directional beams, such as directional optical beams can be used and corresponding optical transmitting hardware is provided in the backhaul base station.

In some examples, the enhanced mobile device is provided with a directional antenna for transmitting the uplink to the backhaul base station via a directional beam. In other examples, other directional beams, such as directional optical beams can be used and corresponding optical transmitting hardware is provided in the enhanced mobile device.

Generally it will be understood that the temporary wireless backhaul communication link can be provided by any suitable means for connecting the backhaul base station 201 with an enhanced mobile device. In other examples, the downlink channel of the temporary wireless communication link can be provided by an optical link. In such examples, the transceiver unit 702 of the enhanced mobile devices will be suitable adapted to receive data via an optical link.

The backhaul base station can be physically implemented in any suitable form. In some examples, the backhaul base station is installed at a permanent or semi-permanent position within the network. In other examples, the backhaul base station may be a mobile unit that can be moved around from position to position. In this example, the backhaul base station can be temporarily installed to supplement the communication capacity of a particular area of a network. In other examples, the backhaul base station may be incorporated within a vehicle, such as an aerial vehicle like an airship. In such examples, the backhaul communication link connecting the backhaul base station to the core network can be provided by a suitable data link, such as a microwave communication link or a satellite communication link.

In FIGS. 2 and 3, the network control element 207 is described in terms of a single network element connected to the backhaul base station 201. The functions performed by the network control element include monitoring the enhanced mobile device; determining which enhanced mobile devices are available to be configured as temporary base stations; determining when an enhanced mobile device currently configured as a temporary base station should be re-configured to function as a mobile device; selecting a new enhanced mobile device to be configured as a temporary base station and managing the handover process. However, it will be understood that these functions can be performed by any suitable network element or elements distributed physically or logically throughout the network. In some examples, the network control element may be located within a backhaul base station, thus with reference to FIG. 2 for example, the network control element 207 would be situated within the backhaul base station 201. As will be appreciated, this would remove the need for the control link 212. In other examples, the network control element may be located within the core network. In some examples, all the backhaul base stations deployed within a network may be logically and/or physically connected to a single network control element. In other examples, a network may include a number of network control elements, each of which are connected to a subset of the backhaul base stations.

Software Defined Networking

In some examples the enhanced mobile devices can provide temporary base stations based on software defined networking techniques. As is known, using software defined networking, mobile devices connect to a "virtual" base station the physical location of which remains transparent to the mobile devices due to the provision of an additional software defined network application layer. In such examples, a virtual base station is associated with an enhanced mobile device when it is configured as a temporary base station. During the handover procedure, the virtual base station is configured to operate across the original enhanced mobile device and the new selected enhanced mobile device. The virtual base station is then disassociated with the original enhanced mobile device which is then reconfigured to function as a mobile device. Alternatively, during handover, the virtual base station is simply switched from the first enhanced mobile device to the second enhanced mobile device. In accordance with software defined networking techniques, this process remains transparent to the mobile devices.

The networks shown in FIGS. 2 and 3 are simple examples showing only two enhanced mobile devices in the second coverage area 111 and a single backhaul base station 201. However, in some implementations, the network may include many backhaul base stations each of which can operate in a specific cell or across multiple cells. Similarly, multiple backhaul base stations may operate in a single cell.

Further, an individual backhaul base station may be able to simultaneously support more than one temporary wireless backhaul communication link and thereby support simultaneous communication with multiple enhanced mobile devices simultaneously acting as a base station for one or more mobile devices.

In further examples, advanced techniques such as coordinated multipoint (CoMP) and physical layer network coding can be used.

In examples in which coordinated multipoint (CoMP) techniques are used, two or more enhanced mobile devices can act as a temporary base stations at the same time and provide a co-ordinated link (i.e. temporary base station interface) to one or more mobile devices.

In examples in which physical layer network coding techniques are used, two or more enhanced mobile devices can act as a temporary base stations at the same time and provide a co-ordinated link (i.e. temporary base station interface) to two or more mobile devices.

As mentioned above, in some examples, a user of an enhanced mobile device may be able to specify that they do not wish their enhanced mobile device to be configured to function as a temporary base station. This can be by entering preference data via a graphical user interface controlled by a computer program running on the enhanced mobile device, such as the app as described above.

In some examples, the network can be arranged to provide specific preferential conditions for enhanced mobile devices that are enabled to periodically function as temporary base stations. Data indicating specific enhanced mobile devices that can function as temporary base stations can be sent from the network control element 207 to the core network. In response the core network can be arranged to provide these specific enhanced mobile devices with higher data bandwidths when they are functioning as mobile devices. Alternatively or additionally, a user may receive a financial reward such as a reduced monthly bill.

In some examples, messages from the core network may be sent to specific enhanced mobile devices comprising request data. The request data indicates to a user that the network is requesting that they (the user) allow their device to function as a temporary base station. Such messages could be sent to enhanced mobile devices in areas of the network currently experiencing or expected to experience communication capacity issues. In some examples, if the user reacts to such a message by permitting their device to act as a temporary base station (for example by inputting the preference data to the app as described above or by downloading the app and inputting the preference data), then that user can be rewarded by the preferential conditions as described above. In this way, additional communication capacity can be provided by "crowd sourcing".

It will be understood that the principles of the present invention can be implemented in any type of suitably modified communication network which employs a plurality of base stations to communicate data to and from mobile devices. This includes cellular communication networks such as 2G (e.g. GSM), 3G (e.g. UMTS) and 4G (e.g. LTE) networks. Any suitable radio interface can be used to provide the uplink and downlink channels of the wireless connections between the enhanced mobile devices functioning as temporary base stations and the mobile devices including time division multiple access (TDMA) interfaces; frequency division multiple access (FDMA) interfaces; code division multiple access (CDMA) interfaces and orthogonal frequency division multiple access (OFDMA) interfaces.

The term "coverage area" has generally been used throughout the description. However, it will be understood that this term covers the same concept as the term "cell" in the context of mobile communication networks Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of the features and/or steps are mutually exclusive. The invention is not restricted to any details of any foregoing embodiments. The invention extends to any novel one, or novel combination, of the features disclosed in this specification (including any accompanying claims, abstract and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

The invention claimed is:

1. A communication network comprising:
a plurality of permanent base stations arranged to create a core network with a plurality of mobile devices, and
at least one backhaul base station operable to establish a backhaul wireless communication link with a selected mobile device from the plurality of mobile devices, the backhaul wireless communication link enabling the selected mobile device to operate as a temporary base station in the core network and simultaneously provide further wireless communication links to two or more of the plurality of mobile devices for communicating data to the at least one backhaul base station via the backhaul wireless communication link.

2. The communication network according to claim 1, wherein each temporary base station radio interface corresponds to a base station radio interface provided by other base stations of the plurality of permanent base stations.

3. The communication network according to claim 1, wherein the backhaul wireless communication link provides a backhaul communication link for communicating data to and from a core network of the communication network.

4. The communication network according to claim 3, wherein the backhaul communication link provides a high data capacity link.

5. The communication network according to claim 1, wherein the communication network further comprises a network control element and the backhaul base station is operable to establish a second backhaul wireless communication link with a second selected mobile device of the plurality of mobile devices in response to the network control element determining if at least one re-selection criteria is satisfied, said second backhaul wireless communication link enabling the second selected device to simultaneously provide a second set of further wireless communication links to two or more mobile devices for communicating data in the network via the second backhaul wireless communication link.

6. The communication network according to claim 5, wherein the backhaul base station ceases to provide the backhaul wireless communication link to the selected mobile device responsive to the re-selection criteria being satisfied.

7. The communication network according to claim 5, wherein the backhaul base station is operable to establish the second backhaul wireless communication link with the second selected device in response to the network control element selecting the second selected device from a set of the plurality of mobile devices available to provide further wireless communication links to other mobile devices based on one or more selection parameters associated with the second selected device.

8. The communication network according to claim 7, wherein the selection parameters include a parameter indicating whether the second selected device is externally powered.

9. The communication network according to claim 7, wherein the selection parameters include a parameter indicating whether or not a threshold amount of energy is available in a battery cell of the second selected device.

10. The communication network according to claim 7, wherein the selection parameters include a parameter indicating a number of mobile devices of the plurality of mobile devices to which the second selected device can provide the second set of further wireless communication links.

11. The communication network according to claim 5, wherein the backhaul base station is operable to establish the second backhaul wireless communication link with the second selected device in response to the network control element randomly selecting the second selected device from the set of the plurality of mobile devices available to provide further wireless communication links to other mobile devices.

12. The communication network according to claim 1, wherein a downlink channel and/or uplink channel of the backhaul wireless communication link, or a downlink channel and/or uplink channel of the backhaul wireless communication link and a downlink channel and/or uplink channel of the second backhaul wireless communication link, are provided by a directional beam.

13. The communication network according to claim 1, wherein the backhaul base station is incorporated in an aerial vehicle.

14. The communication network according to claim 1, wherein the backhaul base station is operable to establish a further wireless communication link with a further selected mobile device from the plurality of mobile devices, said further wireless communication link enabling the further selected mobile device, and the selected mobile device to provide the further wireless communication links to two of the two or more mobile devices in accordance with a physical layer network coding arrangement.

15. The communication network according to claim 1, wherein the backhaul base station is operable to establish a further wireless communication link with a further selected mobile device from the plurality of mobile devices, said further wireless communication link enabling the further selected mobile device, and the selected mobile device to provide the further wireless communication links to one or more of the two or more mobile devices in accordance with a co-ordinated multipoint (CoMP) arrangement.

16. A method of operating a mobile device in a communication network according to claim 1, said method comprising, at the mobile device:
establishing the backhaul wireless communication link with the backhaul base station, and, upon establishment of the backhaul wireless communication link,
simultaneously providing further wireless communication links to two or more mobile devices for communicating data via the backhaul wireless communication link, and
providing the further wireless communication links by a temporary base station radio interface provided by the temporary base station.

17. The method according to claim 16, wherein the temporary base station radio interface corresponds to a base station radio interface provided by other base stations of the communication network.

18. A computer program comprising instructions which when implemented on a computer processor causes the computer processor to perform a method according to claim 16.

19. A method of communicating data in a communication network comprising a plurality of permanent base stations arranged to create a core network with a plurality of mobile devices, said method comprising:
establishing a backhaul wireless communication link between a selected mobile device of the plurality of mobile devices and a backhaul base station to cause the selected mobile device to operate as a temporary base station in the core network, and
by virtue of the backhaul wireless communication link, simultaneously providing further wireless communication links to two or more mobile devices for communicating data via the backhaul wireless communication link, wherein the further wireless communication links are provided by a temporary base station radio interface provided by the temporary base station.

* * * * *